R. J. GALBRAITH.
STEAM GENERATOR.
APPLICATION FILED AUG. 7, 1908.

961,490.

Patented June 14, 1910.
2 SHEETS—SHEET 1.

Witnesses
E. K. Reichenbach.
C. N. Woodward.

Inventor
R. J. Galbraith
By Chandler & Chandler
Attorneys

R. J. GALBRAITH.
STEAM GENERATOR.
APPLICATION FILED AUG. 7, 1908.

961,490.

Patented June 14, 1910.

2 SHEETS—SHEET 2.

Witnesses
C. K. Reichenbach
C. N. Woodward

Inventor
R. J. Galbraith
By Chandler & Chandler
Attorneys

UNITED STATES PATENT OFFICE.

ROBERT J. GALBRAITH, OF ALBANY, OREGON.

STEAM-GENERATOR.

961,490.   Specification of Letters Patent.   Patented June 14, 1910.

Application filed August 7, 1908. Serial No. 447,432.

*To all whom it may concern:*

Be it known that I, ROBERT J. GALBRAITH, a citizen of the United States, residing at Albany, in the county of Linn, State of Oregon, have invented certain new and useful Improvements in Steam-Generators; and I do hereby declare the following to be a full, clear, and exact description of the invention, such as will enable others skilled in the art to which it appertains to make and use the same.

This invention relates to steam generators and has for one of its objects to improve the construction and increase the efficiency and economy of operation of devices of this character.

Another object of the invention is to provide a device of this character wherein the water is distributed in thin sheets throughout the interior of the generator and rapidly circulated and subjected to the influence of the fire in that condition, whereby the units of heat are thoroughly utilized and increased economy in the use of the fuel thereby effected.

With these and other objects in view the invention consists in a generator formed of two inner heads spaced apart and comprising the ends of the fuel chamber, two outer heads spaced from the inner heads and coupled thereto to form water spaces therebetween, water tubes connecting the inner heads, flues connecting the outer heads and extending through the water tubes, and a jacket surrounding the spaced heads and their tubes and flues, whereby the water is arranged in thin sheets throughout the entire water space in the generator and subjected to the influence of the heat in that position.

Figure 1:
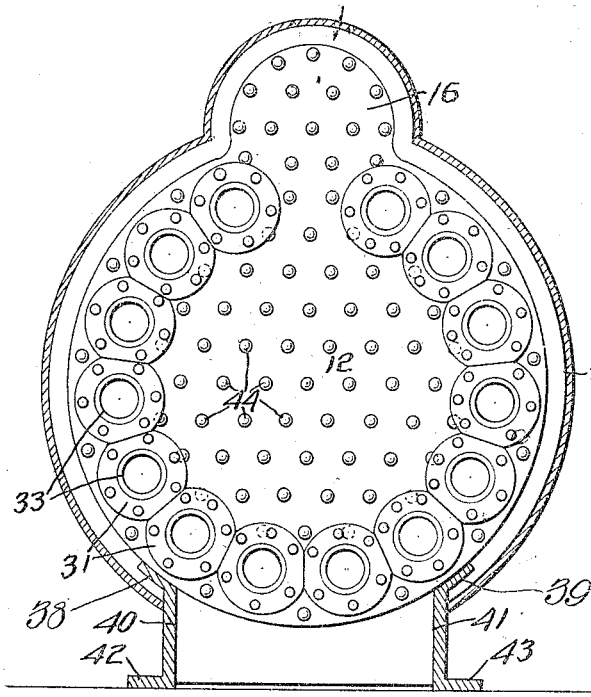
Figure 2:
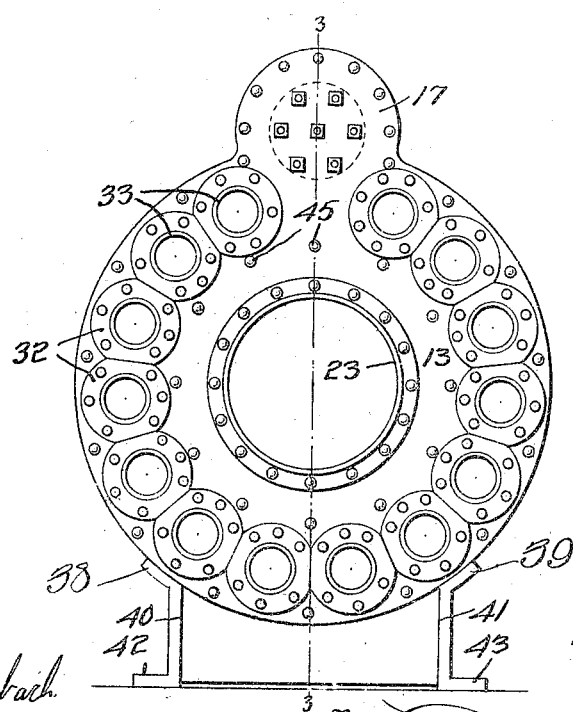
Figure 3:
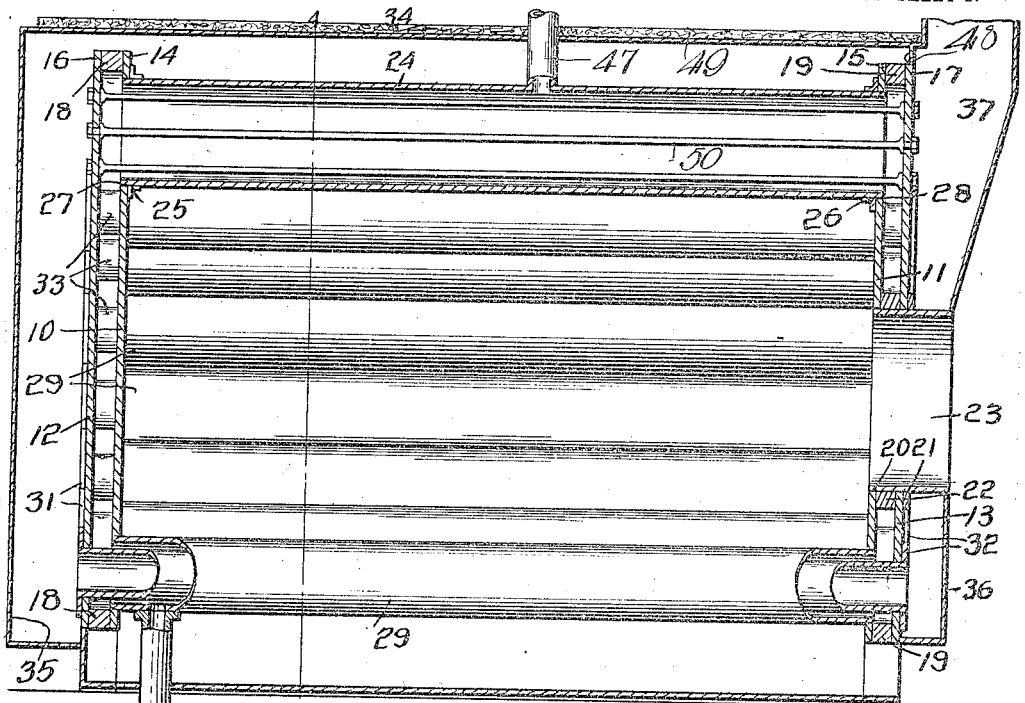
Figure 4:
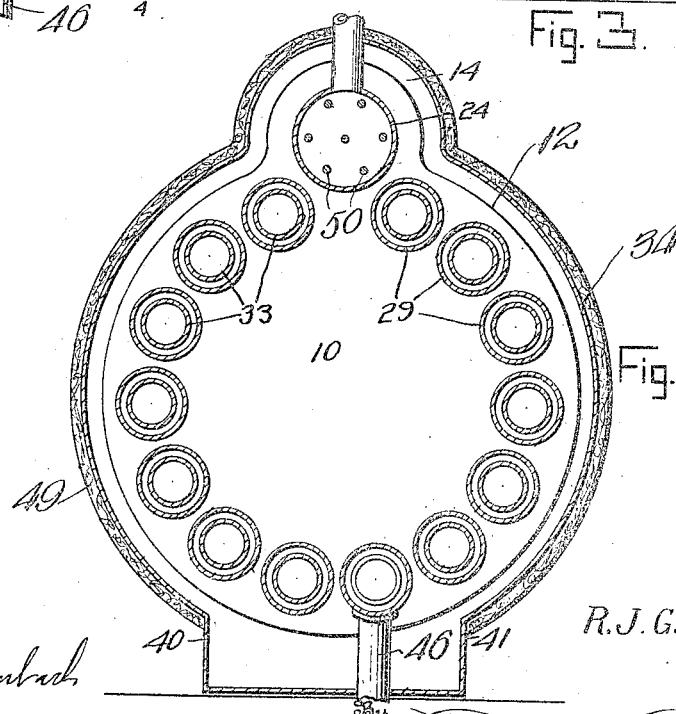

The invention further consists in certain novel features of construction as hereafter shown and described and then specifically pointed out in the claim, and in the drawings illustrating the preferred embodiment of the invention, Figure 1 is a rear elevation, with the shell in section. Fig. 2 is a front elevation, with the smoke arch and shell detached. Fig. 3 is a vertical longitudinal section on the line 3—3 of Fig. 2. Fig. 4 is a transverse section on the line 4—4 of Fig. 3.

The improved device comprises two inner heads 10—11 and two outer heads 12—13, the heads 11—13 disposed at the forward end of the generator and the heads 10—12 disposed at the rear end of the generator, the heads 11—13 being spaced a relatively short distance apart, and the heads 10—12 being likewise spaced a corresponding distance as shown. The heads are formed respectively with upwardly extending portions 14—15 and 16—17. The heads 10—12 including the extensions 14—16 are connected by a "ring" or band 18, while the heads 11—13 including the extensions 15—17 are likewise connected by a ring or band 19. The heads 11—13 are pierced centrally by apertures 20—21, surrounded by a connecting ring 22 and with an annular member 23 fitting within the openings and extending beyond the head 13 and constituting the fuel opening of the generator. The extensions 16—17 are pierced to receive the ends of a relatively large tube or pipe 24, the tube being strengthened at its juncture with the extensions by flanges 25—26 riveted to the extensions at 27—28 and into which the ends of the tube are threaded, as shown. The relatively large tube or pipe 24 constitutes the steam chamber or "dome" of the generator. The heads 10—11 are also each provided with a series of openings arranged in circles and into which medium sized tubes 29 are secured, the large tubes 24 and the medium sized tubes 29 thus providing communication between the spaces or "water legs" between the heads, as hereafter explained. The outer heads 12—13 are also pierced opposite the openings for the tubes 29 by smaller openings, and secured to the outer heads and surrounding these latter openings and riveted to the heads, are flanges 31—32 into which smaller flues 33 are secured preferably by threading, and extending through the medium sized tubes 29 and providing communication entirely through the generator, as shown.

Surrounding the spaced heads including the extensions and spaced therefrom is a shell formed of a body or side portion 34, a rear head 35 and a front head 36, the front head having an opening corresponding to and surrounding the fuel opening, while a smoke stack 37 extends from the front 36 of the shell, as shown.

Connected by flanges 38—39 to the lower portions of the heads 10—11 and 12—13 and their rings 18—19 are vertical members 40—41 spaced apart and forming the ash pit for the generator. The members 40—41 also serve as supports for the generator, and are formed with lateral flanges 42—43 at their lower ends to increase the stability.

The heads 10—12 are connected by numerous stay bolts 44 while the heads 11—13 are likewise supported by similar stay bolts 45.

The tubes 29 are arranged relatively close, and serve as grate bars, the fire being built directly on the tubes, and enwrapping all the outer surfaces thereof, passes to the shell 34 and thence through the smaller flues and thence through the stack 37. The water filling the spaces between the heads 10—12 and 11—13 and also filling the spaces between the tubes 29 and flues 30 is thus arranged in thin sheets throughout the whole generator, and caused to circulate rapidly.

The intake for the water is shown at 46, and the outlet is arranged to lead from the larger tube 24 as shown at 47.

The shell or jacket 34 is shut off opposite the forward head 13 as shown at 48 so that the products of the combustion are forced to pass around the rear heads 10—12 and into the smoke arch formed by the end 35 of the shell and thence through the flues into the forward smoke arch 36 before they can reach the stack 37. The products of the combustion are thus caused to traverse over the whole surface of all the water tubes before they reach the jacket and thence travel in their return passage through the flues. The heat generated or radiated by the fuel is thus utilized to the fullest extent, and all waste obviated. The jacket or shell will be covered with suitable protecting material such as asbestos or other non-conducting covering, as shown at 49.

The generator may be formed in any desired size but for an ordinary generator the heads will be about four feet in diameter and the tubes and flues about ten feet long, but it will be understood that the boiler may be formed of any desired size or in any desired proportions, and the invention therefore is not limited to any proportions or size.

The bolts 50 connect the outer heads 12—13 through the larger flue 24, as shown, to strengthen the structure.

What is claimed, is:—

A steam generator comprising inner heads spaced apart and each provided with an upwardly directed extension, outer heads spaced from said inner heads and each provided with an upwardly directed extension, connecting means between each inner head and its extension and the adjacent outer head and its extension and arranging the heads in pairs at each end of the generator, one of said spaced pairs having a fuel opening therethrough, a plurality of relatively small tubes connecting the inner heads near their peripheries and spaced slightly apart with the tubes nearest the extensions spaced a greater distance apart, a plurality of flues connecting the outer heads and extending through the tubes which connect the inner heads, and a relatively large tube connecting the extension of the inner heads and above the large space between the upper tubes.

In testimony whereof, I affix my signature, in presence of two witnesses.

ROBERT J. GALBRAITH.

Witnesses:
E. R. BRYSON,
LENA FLEET.